United States Patent
Ogoshi et al.

(10) Patent No.: US 9,329,090 B2
(45) Date of Patent: May 3, 2016

(54) ELECTRONIC DEVICE WITH TEMPERATURE DETECTING ELEMENT

(71) Applicant: DENSO CORPORATION, Kariya, Aichi (JP)

(72) Inventors: Junichi Ogoshi, Kariya (JP); Hiroyuki Kawata, Chiryu (JP); Toshio Tsutsui, Takahama (JP); Shinsuke Ota, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/578,551

(22) Filed: Dec. 22, 2014

(65) Prior Publication Data
US 2015/0185087 A1    Jul. 2, 2015

(30) Foreign Application Priority Data
Dec. 26, 2013  (JP) ................................ 2013-269277

(51) Int. Cl.
G01K 7/22      (2006.01)
G01K 1/16      (2006.01)

(52) U.S. Cl.
CPC ... *G01K 7/22* (2013.01); *G01K 1/16* (2013.01)

(58) Field of Classification Search
CPC .................................. G01K 1/16; G01K 7/22
USPC ........ 374/165, 174, E1.021, 29, 30, 137, 4, 5, 374/170, 178; 324/522, 750.03, 750.09, 324/750.11, 537, 750.14; 702/132
See application file for complete search history.

(56) References Cited

U.S. PATENT DOCUMENTS

| | | | | |
|---|---|---|---|---|
| 3,774,078 A | * | 11/1973 | Martin | ............... H05K 7/20509 174/16.3 |
| 2003/0227067 A1 | * | 12/2003 | Wienand | ................ G01K 7/183 257/467 |
| 2005/0218471 A1 | * | 10/2005 | Ohkubo | ................... G01K 7/16 257/467 |

(Continued)

FOREIGN PATENT DOCUMENTS

| | | |
|---|---|---|
| JP | 7-336030 | 12/1995 |
| JP | 2000-229434 | 8/2000 |

(Continued)

OTHER PUBLICATIONS

Office Action (4 pages) dated Dec. 22, 2015, issued in corresponding Japanese Application No. 2013-269277 and English translation (4 pages).

*Primary Examiner* — Lisa Caputo
*Assistant Examiner* — Philip Cotey
(74) *Attorney, Agent, or Firm* — Nixon & Vanderhye PC (57) ABSTRACT

In an electronic device, a heat generation part pattern is connected to a heat generating element to heat from the heat generating element. A temperature detecting element is disposed adjacent to a first surface of a substrate. A direct under layer pattern is disposed on a second surface of the substrate opposite to the temperature detecting element in an area including a portion corresponding to the temperature detecting element. An interlayer connection pillar connects between the heat generation part pattern and the direct under layer pattern to conduct heat. The heat generated from the heat generating element is effectively conducted to the temperature detecting element through the heat generation part pattern, the interlayer connection pillar, and the direct under layer pattern, and thus the temperature detecting element accurately detects the temperature of the heat generating element.

6 Claims, 8 Drawing Sheets

(56) References Cited

U.S. PATENT DOCUMENTS

| | | | |
|---|---|---|---|
| 2007/0285116 A1* | 12/2007 | Aube | G01R 31/2875 324/750.09 |
| 2008/0032347 A1* | 2/2008 | Sarofim | B01L 7/52 435/91.2 |
| 2008/0236175 A1* | 10/2008 | Chaparro Monferrer | F25B 21/02 62/3.2 |
| 2009/0024969 A1* | 1/2009 | Chandra | G06F 17/5009 716/106 |
| 2009/0160044 A1 | 6/2009 | Taniguchi et al. | |
| 2010/0135357 A1* | 6/2010 | Chancy | G01B 5/0014 374/179 |
| 2010/0213603 A1* | 8/2010 | Smeys | H01L 21/4853 257/698 |
| 2011/0272581 A1* | 11/2011 | Noda | G01J 5/02 250/338.3 |
| 2012/0119767 A1* | 5/2012 | Su | G01R 31/2817 324/750.03 |
| 2013/0279538 A1* | 10/2013 | Beratan | G01J 5/046 374/165 |
| 2013/0334646 A1* | 12/2013 | Chen | G01K 7/183 257/467 |
| 2014/0036953 A1* | 2/2014 | Kimura | G01J 5/16 374/121 |
| 2014/0112371 A1* | 4/2014 | Yang | G01K 7/00 374/163 |

FOREIGN PATENT DOCUMENTS

| | | |
|---|---|---|
| JP | 2004-276375 | 10/2004 |
| JP | 2007-93453 | 4/2007 |
| JP | 2010-267724 | 11/2010 |
| JP | 2011-009436 | 1/2011 |
| JP | 2012-235036 | 11/2012 |

\* cited by examiner

ELECTRONIC DEVICE WITH TEMPERATURE DETECTING ELEMENT

CROSS REFERENCE TO RELATED APPLICATION

This application is based on Japanese Patent Application No. 2013-269277 filed on Dec. 26, 2013, the disclosure of which is incorporated herein by reference.

TECHNICAL FIELD

The present disclosure relates to an electronic device having a heat generating element and a temperature detecting element.

BACKGROUND

Conventionally, it has been known an electronic device having a temperature detecting element that detects a temperature of a heat generating element mounted on a circuit board. For example, JP 2011-9436 A discloses a circuit board having a conductive pattern on a surface opposite to a surface on which a chip thermistor is mounted. When the temperature of a heat generating element rises, heat of the conductive pattern is conducted to a lower surface of the chip thermistor through a lead made of a copper base. The chip thermistor detects the temperature of the heat generating element.

SUMMARY

In a case where a temperature detecting element and a heat generating element, which is an object to be detected, are mounted on the same substrate, it is desirable to arrange the temperature detecting element and the heat generating element adjacent to each other so as to accurately detect the temperature of the heat generating element. However, if it is given priority to arrange the temperature detecting element and the heat generating element adjacent to each other, a peripheral heat generation part pattern, which provides a primary thermal mass of the heat generating element, is reduced, and thus heat dispersibility may be necessarily sacrificed.

In the structure of JP 2011-9436 A, when the board is a single-layer board, the heat of the conductive pattern is effectively conducted to the lower surface of the chip thermistor. However, when the structure of JP 2011-9436 A is employed to a multi-layer board, such as four- to six-layer board, the heat of the conductive pattern is not sufficiently conducted. Therefore, it is difficult to accurately detect the temperature of the heat generating component.

The present disclosure is made in view of the foregoing issue, and it is an object of the present disclosure to provide an electronic device with a structure in which a temperature detecting element can accurately detect the temperature of a heat generating element.

According to an aspect of the present disclosure, an electronic device includes a substrate, a heat generating element, a heat generation part pattern, a temperature detecting element, a direct under layer pattern, and an interlayer connection pillar. The heat generation part pattern is connected to the heat generating element and receives heat from the heat generating element. The temperature detecting element is disposed adjacent to a first surface of the substrate and detects a temperature of the heat generating element. The direct under layer pattern is disposed on a second surface of the substrate opposite to the temperature detecting element and in an area including a portion corresponding to the temperature detecting element. The interlayer connection pillar connects between the heat generation part pattern and the direct under layer pattern to conduct heat from the heat generation part pattern to at least the direct under layer pattern.

In such a structure, the heat generated from the heat generating element is conducted to the direct under layer pattern through the heat generation part pattern and the interlayer connection pillar, and is further conducted from the direct under layer pattern to the temperature detecting element through the substrate. Therefore, the temperature of the heat generating element can be accurately detected by the temperature detecting element.

For example, even if the heat generating element and the temperature detecting element are arranged at separate positions, such as on an upper layer and a lower layer through several layers therebetween in a multi-layer board, the temperature detecting element can accurately detect the temperature of the heat generating element.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Hereinafter, electronic devices according to embodiments of the present disclosure will be described with reference to the drawings.

First Embodiment

An electronic device of a first embodiment of the present disclosure will be described with reference to FIGS. 1 and 2. In the electronic device, wiring patterns forming various electronic circuits are disposed on a printed board or the like. The electronic device includes a "heat generating element" that generates heat due to a relatively large amount of a current flowing and a "temperature detecting element" that detects the temperature of the heat generating element. In the following, the description will be made focusing on a structure for accurately detecting the heat generated from the heat generating element by the temperature detecting element, and descriptions regarding other general matters will be omitted.

Figure 1:
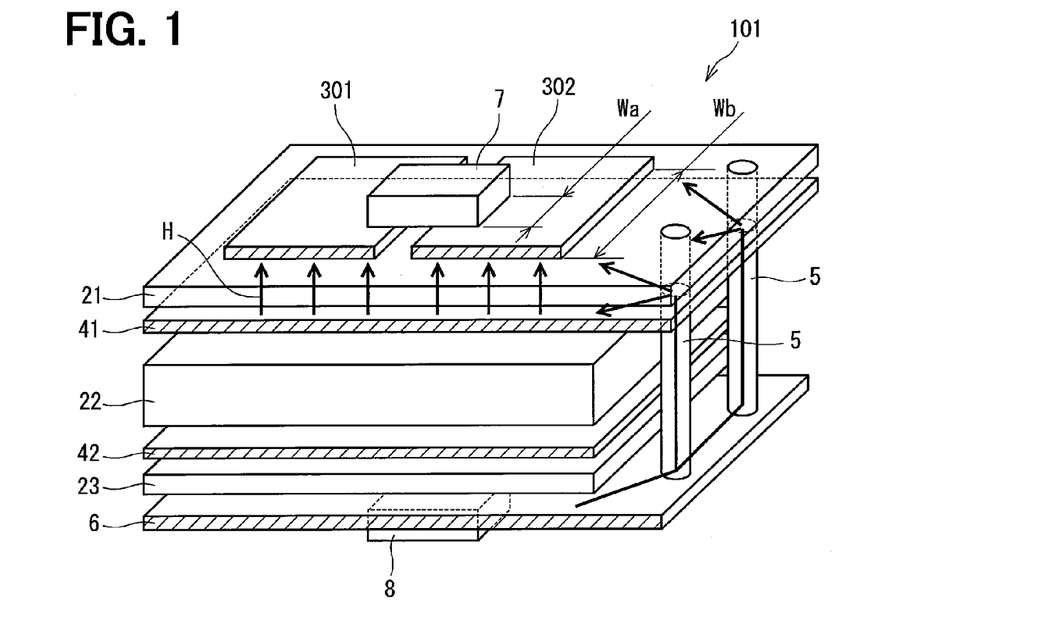
FIG. 1 is an exploded perspective view of an electronic device according to a first embodiment of the present disclosure.
Figure 2:
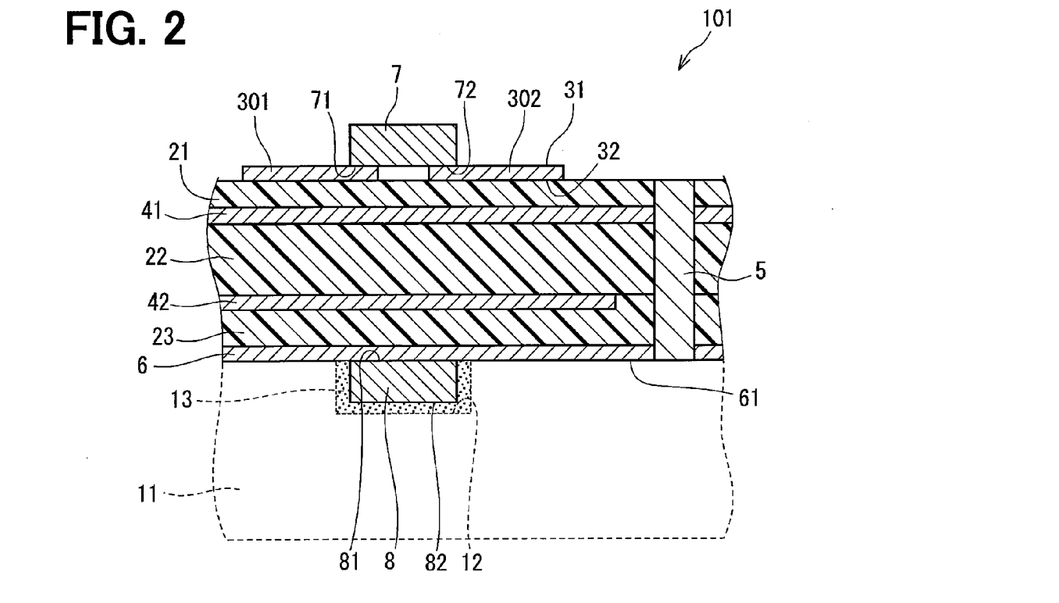
FIG. 2 is a schematic cross-sectional view of the electronic device shown in FIG. 1.

For this reason, in FIGS. 1 and 2, a main part of an electronic device 101 of the first embodiment is schematically illustrated such that the shape thereof is extremely simplified, and is emphasized in a thickness direction. FIG. 1 is an exploded perspective view of a multi-layer board in which substrates 21, 22, 23, layer patterns 301, 302, 41, 42, 6 disposed on surfaces of the substrates 21, 22, 23, and the like are separately illustrated. In this exploded perspective view, the front end surfaces of the layer patterns are illustrated with hatchings to distinguish from the end surfaces of the substrates 21, 22, 23, and the hatchings do not indicate a cross-section.

FIG. 2 is a schematic cross-sectional view corresponding to FIG. 1. In FIG. 2, a heat sink 11 to which the electronic device 101 is fixed is illustrated with a dashed line.

In the following descriptions, a top side of FIGS. 1 and 2 will be referred to as a "top" side of the electronic device 101, and a bottom side of FIGS. 1 and 2 will be referred to as a "bottom" side of the electronic device 101, for convenience. However, such directions are irrelevant to actual directions when the electronic device 101 is used.

In the electronic device 101, the substrates 21, 22, 23 and the layer patterns 301, 302, 41, 42, 6, which are on the surfaces of the substrates 21, 22, 23, are alternately stacked. The substrates 21, 22, 23 are made of an electrically insulating and thermally insulating material, such as a glass epoxy resin or ceramic. A top substrate 21 is particularly referred to as the "first substrate 21". Each of the layer patterns 301, 302, 41, 42, 6 is made of an electrically conductive and thermally conductive metal film, such as copper.

In the present embodiment, the substrates 22, 23 and the inner layer pattern 42 correspond to "the other patterns" and "the other layer pattern", which have no specific technical features. In order to clearly indicate the feature, illustration of the other patterns and the other layer pattern are purposely omitted on a periphery of vias 5 in the exploded perspective view of FIG. 1.

At a bottom side of the electronic device 101, a heat generating element 8 is disposed on a lower surface of a heat generation part pattern 6, which is a lowermost layer. The heat generating element 8 is, for example, a semiconductor switching element used in such as an H-bridge circuit for driving a DC brush motor or an inverter circuit for driving a three-phase alternating current brushless motor. For example, the heat generating element 8 is a MOSFET or the like.

The heat generation part pattern 6 is a pattern including a main current path of the heat generating element 8. In the case where the heat generating element 8 is the MOSFET, the heat generation part pattern 6 forms a drain-source current path.

For example, in a motor that generates a steering assist torque of a vehicular electric power steering apparatus, it is necessary to rapidly generate a large output. In such a case, a large amount of current flows in the semiconductor switching element, and thus the semiconductor switching element generates heat. Further, due to limitation of a mounting space in a vehicle, a driving device is necessarily reduced in size. Therefore, it is in a severe environment where sufficient heat radiation is hard to be carried out. If the semiconductor switching element is overheated over an allowable temperature, there is a possibility that the element is broken, resulting in a failure of a function of assisting a steering operation.

Therefore, a control technology of detecting the temperature of a semiconductor switching element and limiting a current not to overheat the semiconductor switching element over an allowable temperature is necessary. Further, it is necessary to improve detection accuracy so as to minimize an error in temperature detection.

The heat generating element 8 of the electronic device 101 of the present embodiment is assumed to be used in such a purpose. Needless to say, it is just an example that the heat generating element 8 is the semiconductor switching element used for driving the steering assist motor of the electric power steering apparatus. The "heat generating element 8" of the present embodiment can be any element that needs to be protected from overheating.

As shown by the dashed line in FIG. 2, the electronic device 101 of the present embodiment is fixed to the heat sink 11, which is, for example, made of aluminum. In the case where the heat generating element 8 is the semiconductor switching element, the heat generating element 8 is surface-mounted on a mounting surface 61 of the heat generation part pattern 6 in such a manner that a lead part 81 of the semiconductor switching element faces the mounting surface 61, and a rear surface 82 opposite to the lead part 81 is exposed to oppose the heat sink 11. The rear surface 82 provides an exposed surface of a source electrode, for example.

In a state where the electronic device 101 is fixed to the heat sink 11, the heat generating element 8 is received in a recess 12 of the heat sink 11. A heat radiation gel 13 is filled in between the heat generating element 8 and the heat sink 11. The heat radiation gel 13 is made of an electrically insulating and thermally conductive material, such as a silicon-based material. Alternatively, an electrically insulating heat radiation sheet may be disposed in between the heat generating element 8 and the heat sink 11.

By such a structure, a part of heat generated from the heat generating element 8 is conducted to the heat generation part pattern 6 from the lead part 81, and another part of the heat generated from the heat generating element 8 is conducted to the heat sink 11 from the rear surface 82 through the heat radiation gel 13. Therefore, even if the amount of heat generated from the heat generating element 8 is large and it is insufficient to radiate the heat only from the lead part 81, since the heat is radiated from the rear surface 82, overheating of the heat generating element 8 is suitably restricted.

At an upper side of the electronic device 101, heat collecting patterns 301, 302, made of two regions, are provided on an upper surface (first surface) 32 of the first substrate 21. A thermistor 7, which has a chip shape, is disposed on upper surfaces 31 of the heat collecting patterns 301, 302, as a "temperature detecting element". The thermistor 7 has a first contact 71 and a second contact 72. The first contact 71 is connected to the heat collecting pattern 301, and the second contact 72 is connected to the heat collecting pattern 302. The heat collecting pattern 301 is connected to a detection power source of a temperature detection circuit. The heat collecting pattern 302 is connected to the ground. Illustrations of these points are omitted in FIGS. 1 and 2, but these points will be described later in detail with reference to FIG. 8.

The temperature detection circuit detects a voltage between the first contact 71 and the second contact 72 of the thermistor 7, and converts the voltage detected into a temperature. The thermistor 7 may be a PTC thermistor in which a resistance increases with an increase in temperature, or an NTC thermistor in which a resistance decreases with an increase in temperature.

A direct under layer pattern 41 is provided between a lower surface (second surface) of the first substrate 21 and the substrate 22, the lower surface of the first substrate 21 being on a side opposite to the thermistor 7. In particular, the direct under layer pattern 41 is provided in a wide area including portions directly under the thermistor 7 and the heat collecting patterns 301, 302, on the second surface of the first substrate 21. In other words, the direct under layer pattern 41 is disposed in an area including portions corresponding to the thermistor 7 and the heat collecting patterns 301, 302 in a direction perpendicular to the first substrate 21, on the second surface of the first substrate 21. The direct under layer pattern 41 is disposed in an area including at least a portion corresponding to the thermistor 7 in a direction perpendicular to the first substrate 21, on the second surface of the first substrate 21.

Vias 5 are connected at predetermined portions of the direct under layer pattern 41 to connect between the direct under layer pattern 41 and the heat generation part pattern 6 and to conduct heat, as "interlayer connection pillars". As shown by arrows in FIG. 1, the heat generated from the heat generating element 8 is conducted to the direct under layer pattern 41 through the heat generation part pattern 6 and the vias 5.

The vias 5 may be formed such that upper ends thereof penetrate through the first substrate 21, as shown in FIG. 1, or the upper ends thereof are ended at the height of the direct under layer pattern 41. The shape of the vias 5 may not be limited to the solid columnar shape, as shown in FIG. 1. The shape of the vias 5 may be a polygonal pillar. Further, a stack via and a filled via also correspond to such vias. In FIG. 1, two vias 5 are disposed parallel to each other. However, the number of the via 5 and the arrangement of the via 5 are not limited to the example shown in FIG. 1. The specific shape of the vias 5 may be suitably selected according to a production method or the like.

Back to the explanation of the heat collecting patterns 301, 302, the heat collecting patterns 301, 302 have a function of receiving heat from the direct under layer pattern 41, in addition to the function as a wiring pattern having the same potential as the first and second contacts 71, 72 of the thermistor 7 and forming the temperature detection circuit.

If the heat collecting patterns 301, 302 only have the function as the wiring patterns, the width of the heat collecting patterns 301, 302 may be the same as the width of the thermistor 7. However, to achieve the function of receiving the heat from the direct under layer pattern 41, the width Wb of the heat collecting patterns 301, 302 is greater than the width Wa of the thermistor 7. Therefore, the heat collecting patterns 301, 302 are opposed to the direct under layer pattern 41 through the first substrate 21, which is a single layer, and can effectively receive heat H from the direct under layer pattern 41, as shown by the arrows in FIG. 1.

Figure 9:
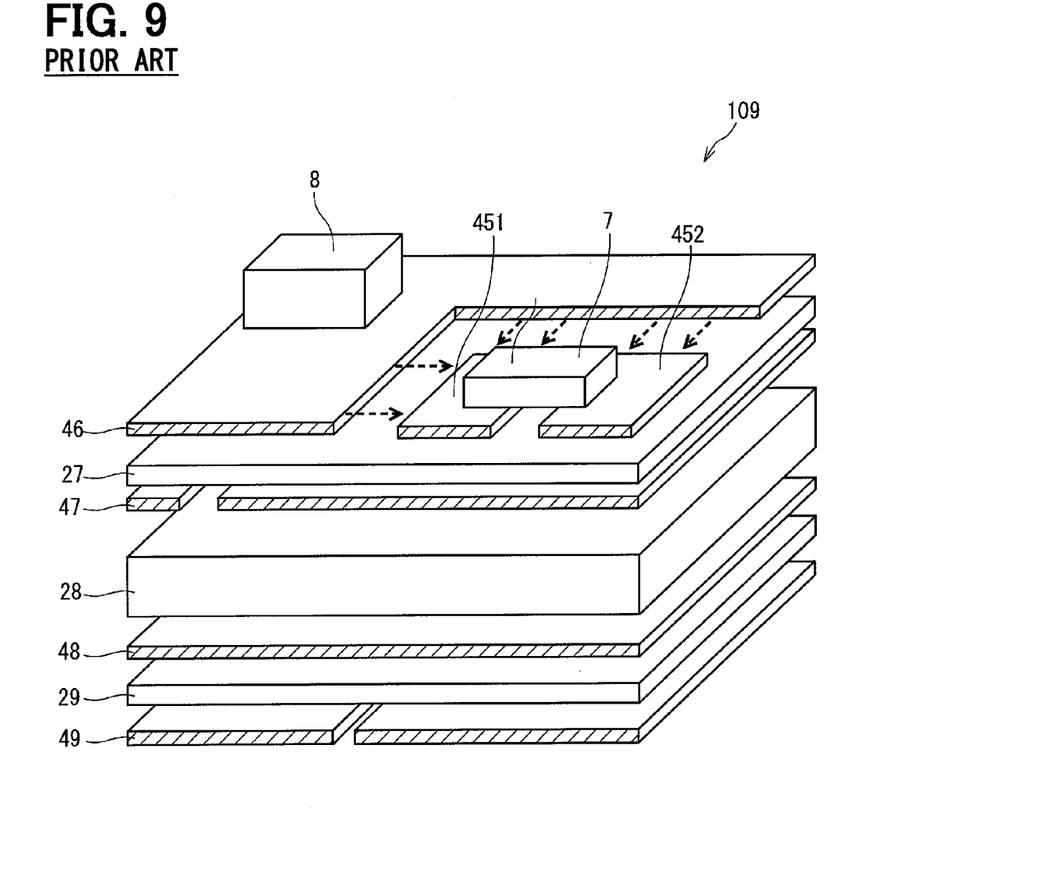
FIG. 9 is an exploded perspective view of an electronic device of a comparative example.

Effects of the electronic device 101 of the present embodiment will be described, as compared with an electronic device of a comparative example. As shown in FIG. 9, in an electronic device 109 of the comparative example, which has a multi-layer structure, the thermistor 7 and the heat generating element 8 are disposed on surface layer patterns 451, 452 and a heat generation part pattern 46, which are disposed on a first substrate 27.

Heat generated from the heat generating element 8 is conducted to the surface layer patterns 451, 452 on which the thermistor 7 is disposed, from the peripheral heat generation part pattern 46 through the surface of a first substrate 27, as shown by dashed arrows. The heat generation part pattern 46 is cut into an L shape to reduce a distance between the heat generating element 8 and the thermistor 7 as small as possible in order to improve accuracy of temperature detection. As a result, the area of the heat generation part pattern 46, as a primary thermal mass of the heat generating element 8, is reduced. That is, contrary to the improvement of the accuracy of temperature detection, heat dispersibility of the heat generating element 8 is sacrificed.

Substrates 28, 29, inner layer patterns 47, 48, a surface layer pattern 49, which are lower than the first substrate 27, correspond to "the other substrates" and "the other layer pattern", which do not need reference.

In the electronic device 101 of the present embodiment, on the other hand, the direct under layer pattern 41 is provided directly under the thermistor 7 through the first substrate 21, and the vias 5 are provided to connect between the direct under layer pattern 41 and the heat generating part pattern 6 to conduct heat. Therefore, even in the structure where the thermistor 7 is disposed on an upper surface layer and the heat generating element 8 is disposed on a lower surface layer through several layers of the multi-layer board, the heat generated from the heat generating element 8 can be effectively conducted to the thermistor 7 through the heat generation part pattern 6, the vias 5, and the direct under layer pattern 41. As such, the thermistor 7 can accurately detect the temperature of the heat generating element 8.

In the present embodiment, the width Wb of the heat collecting patterns 301, 302 connected to the thermistor 7 is greater than the width Wa of the thermistor 7. More preferably, the heat collecting patterns 301, 302 are formed to have an opposed surface area opposed to the direct under layer pattern 41 as large as possible. In such a case, the heat collecting patterns 301, 302 can effectively receive the heat from the direct under layer pattern 41 and conduct the heat to the thermistor 7. Therefore, the thermistor 7 can further accurately detect the temperature of the heat generating element 8.

In the present embodiment, the heat generation part pattern 6 and the direct under layer pattern 41 can be connected in any way through the vias 5. In the electronic device 101, therefore, flexibility in design of arrangement of the thermistor 7 and the heat generating element 8 is high. Accordingly, the present embodiment is suitably used for an electronic device with a "rear surface heat radiation structure" in which the heat generating element 8 such as the MOSFET radiates heat from the rear surface 82 to the heat sink 11 through the heat radiation gel 13, as shown in FIG. 2.

The electronic device 101 of the present embodiment largely exhibits its effects when used for an electronic device that requires accuracy in temperature detection for protecting the heat generating element 8 such as the semiconductor switching element from overheating due to the heat generating element 8 generating a large amount of heat, as the electronic device for the H-bridge circuit or the inverter circuit for driving the steering assist motor of the electric power steering apparatus, as described above.

Next, a second embodiment and a third embodiment will be described with reference to an exploded perspective view and a schematic cross-sectional view corresponding to FIG. 1 and FIG. 2 of the first embodiment. The second and third embodiments are variations in arrangement of the heat generating element 8 in the electronic device of the present disclosure. As the notes regarding the exploded perspective view and the schematic cross-sectional view, the contents of the first embodiment are incorporated. In portions where only the layer pattern is independently illustrated, it is considered that the illustration of the substrates is omitted.

In the description of the following embodiments, structures substantially the same as those of the first embodiment will be designated with the same reference numbers, and descriptions thereof will be omitted.

Second Embodiment

Figure 3:
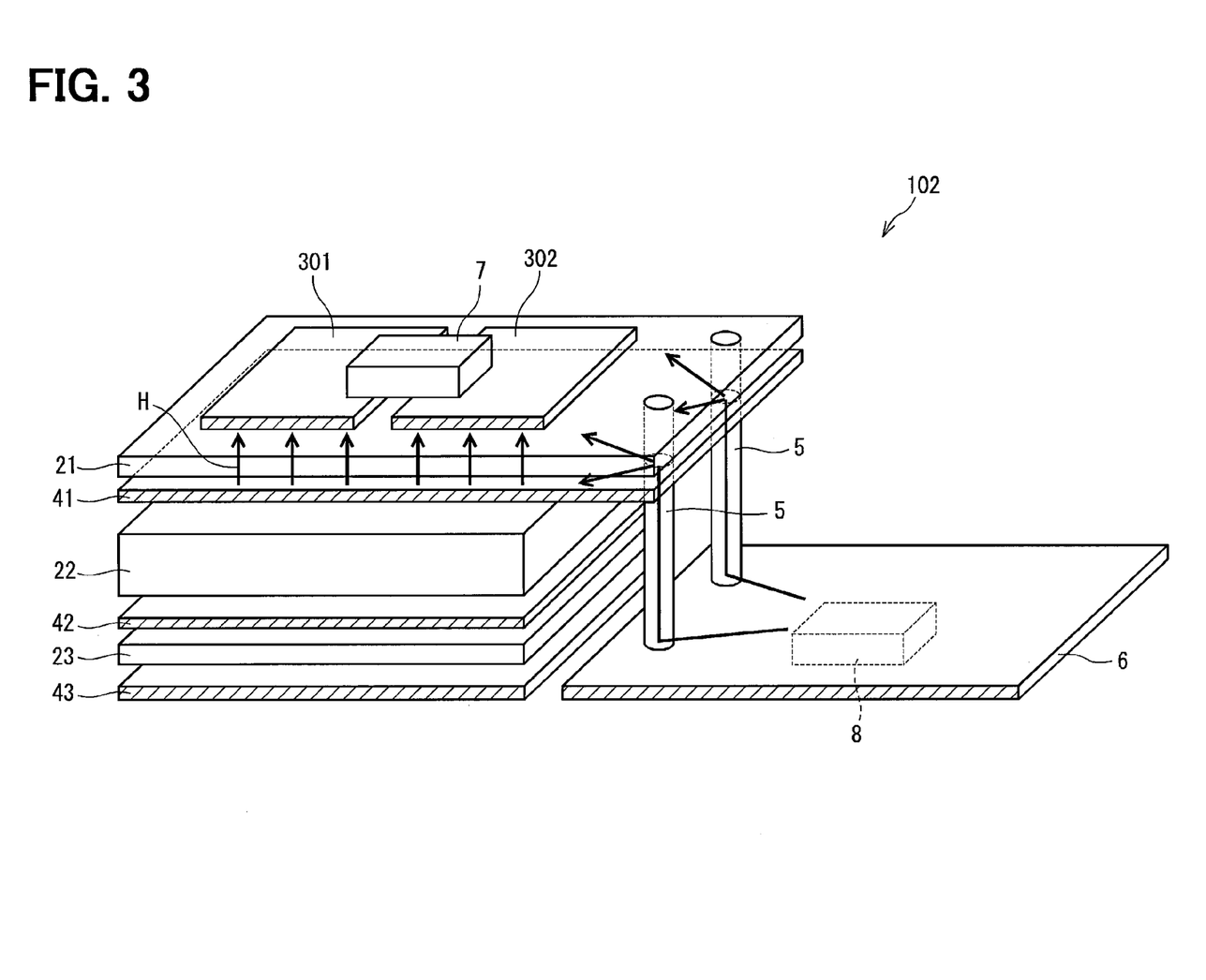
FIG. 3 is an exploded perspective view of an electronic device according to a second embodiment of the present disclosure.

The second embodiment of the present disclosure will be described with reference to FIGS. 3 and 4.

In an electronic device 102 of the second embodiment, the arrangement position of the heat generating element 8 and the heat generation part pattern 6 is offset from the thermistor 7 with respect to a planar direction of the first substrate 21. That is, the heat generating element 8 and the heat generation part pattern 6 are located on an opposite side to the thermistor 7 with respect to the vias 5, as compared to the first embodiment. Also in the second embodiment, similar to the first embodiment, the heat of the heat generating element 8 is conducted from the heat generation part pattern 6 to the direct under layer pattern 41 through the vias 5, and is further conducted from the direct under layer pattern 41 to the heat collecting patterns 301, 302 to reach the thermistor 7. A surface layer pattern 43 disposed on a lower surface of the substrate 23 may be connected to the heat generation part pattern 6 or be separated from the heat generation part pattern 6.

Figure 4:
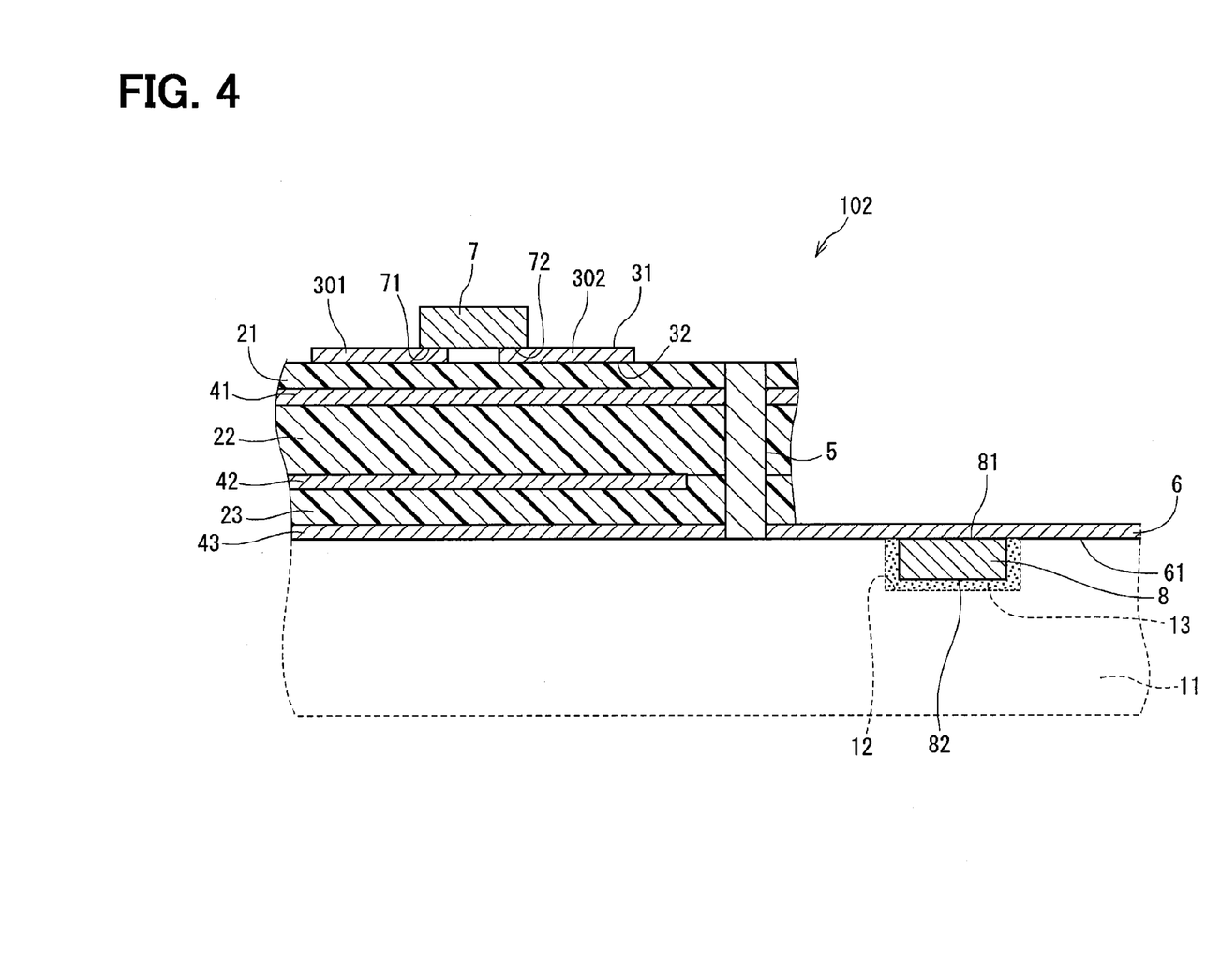
FIG. 4 is a schematic cross-sectional view of the electronic device shown in FIG. 3.

Similarly to the first embodiment, the electronic device 102 of the second embodiment can be suitable to be used for the formation with the "rear surface heat radiation structure" in which the heat is radiated from the rear surface 82 of the heat generating element 8 to the recess 12 through the heat radiation gel 13 or the like, as shown in FIG. 4. Accordingly, the second embodiment achieves effects similar to those of the first embodiment.

Third Embodiment

Figure 5:
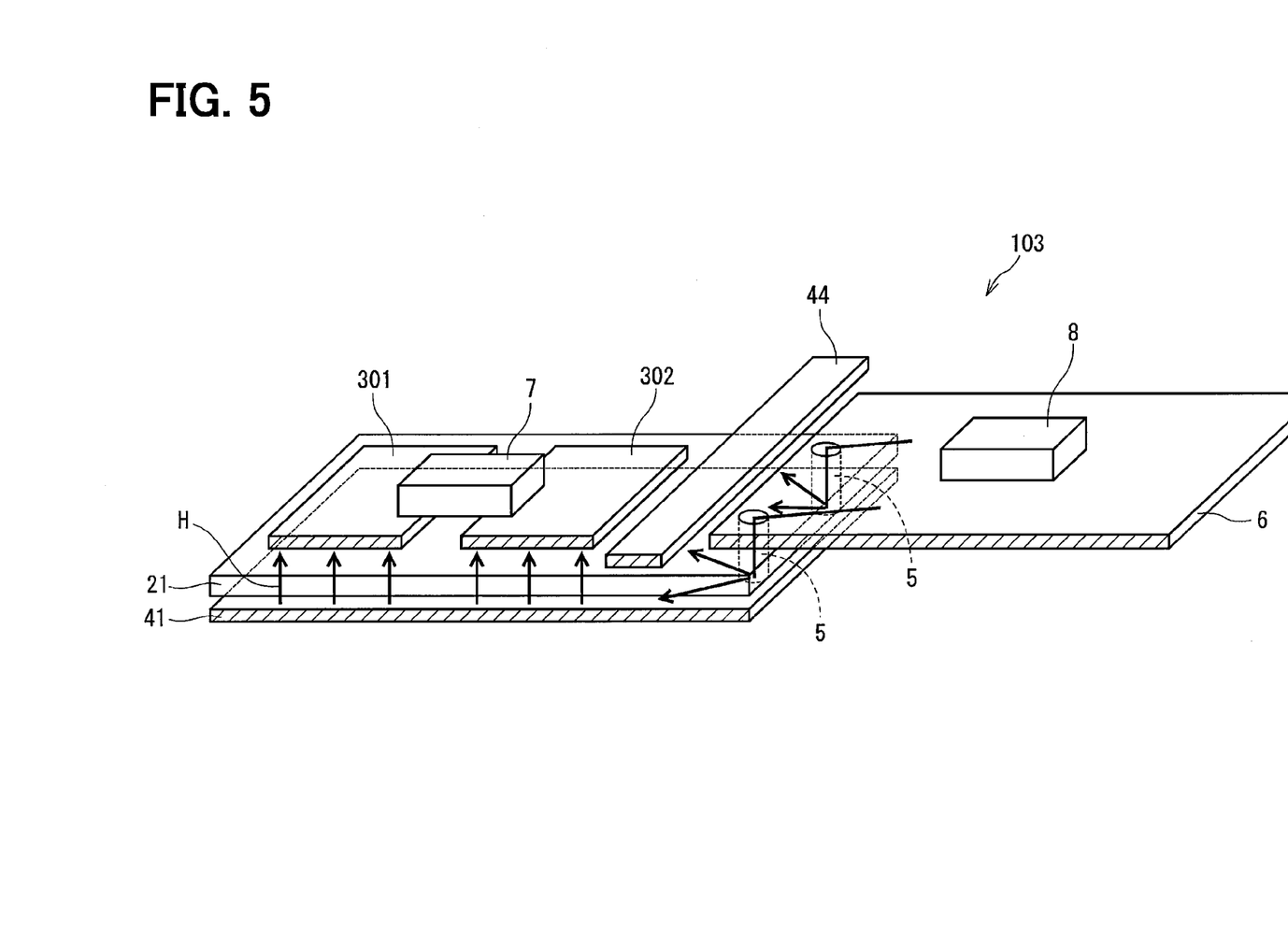
FIG. 5 is an exploded perspective view of an electronic device according to a third embodiment of the present disclosure.
Figure 6:
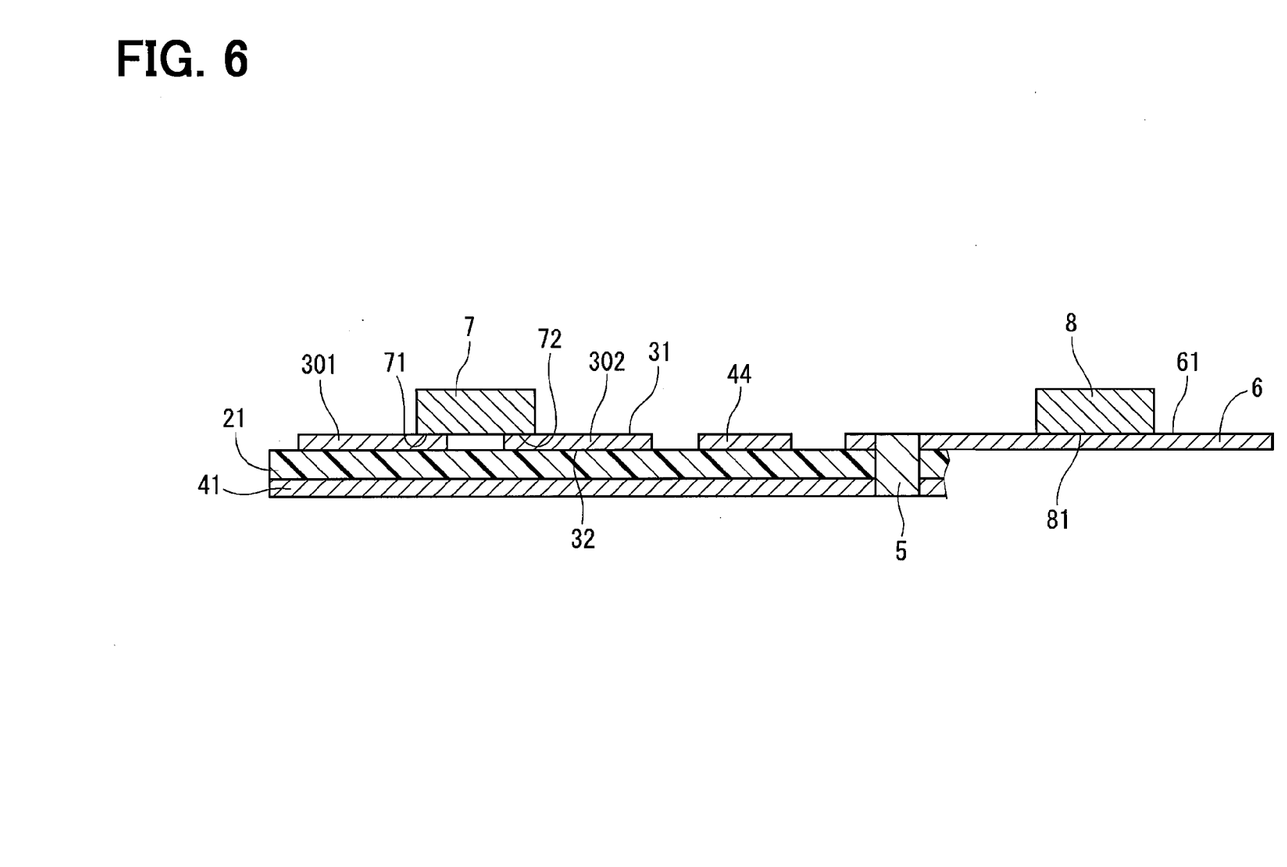
FIG. 6 is a schematic cross-sectional view of the electronic device shown in FIG. 5.

The third embodiment of the present disclosure will be described with reference to FIGS. 5 and 6.

In an electronic device 103 of the third embodiment, the thermistor 7 and the heat generating element 8 are arranged on layer patterns that are disposed on the same first substrate 21. However, the heat of the heat generation part pattern 6 is not directly conducted to the heat collecting patterns 301, 302 on the first substrate 21, but is conducted to the direct under layer pattern 41 through the vias 5 once and then is further conducted from the direct under layer pattern 41 to the heat collecting patterns 301, 302 to reach the thermistor 7.

Therefore, it is not necessary to reduce the heat generation part pattern 46 while sacrificing the thermal mass due to the heat generating element 8 being arranged adjacent to the thermistor 7, as the electronic device 109 of the comparative example. There is no problem if another pattern 44, which has a different potential, or an element is disposed between the heat collecting patterns 301, 302 and the heat generation part pattern 6.

As exemplified in the second and third embodiments described above, in the electronic device of the present disclosure having the direct under layer pattern 41 and the vias 5, the flexibility in design of the arrangement of the heat generating element 8 and the shape of the layer patterns improves, as compared with a conventional art.

Fourth Embodiment and Fifth Embodiment

Next, a fourth embodiment and a fifth embodiment of the present disclosure will be described with reference to FIGS. 7A and 7B and FIG. 8.

Figure 7A:
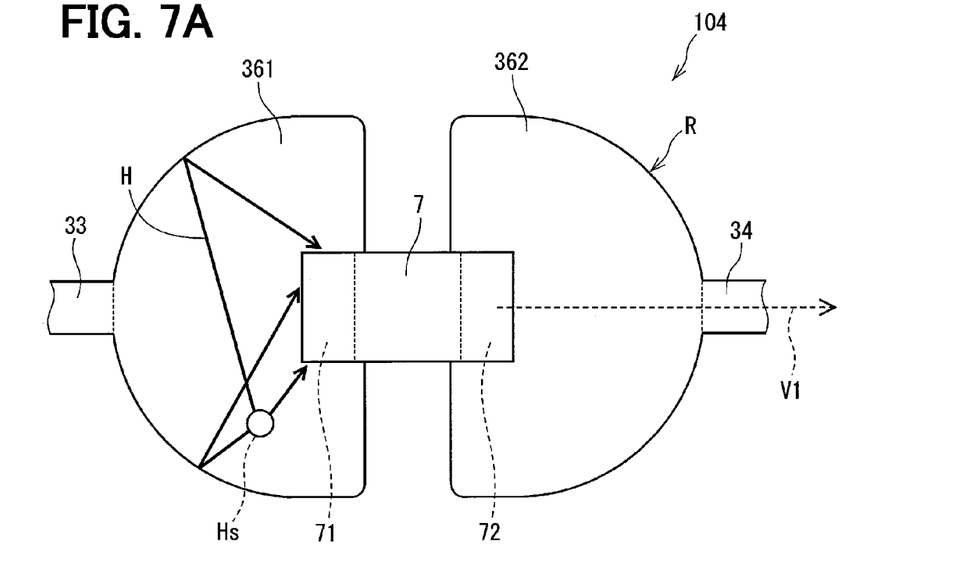
FIG. 7A is a schematic diagram illustrating a heat collecting pattern of an electronic device according to a fourth embodiment of the present disclosure.
Figure 7B:
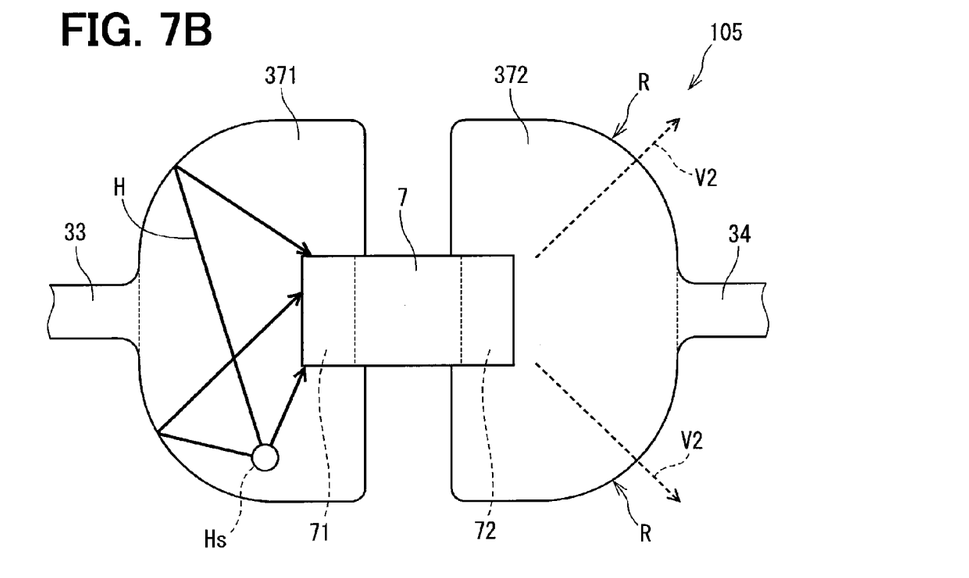
FIG. 7B is a schematic diagram illustrating a heat collecting pattern of an electronic device according to a fifth embodiment of the present disclosure.

FIGS. 7A and 7B illustrate variations in the shape of the heat collecting patterns. The variations of the shape of the heat collecting patterns shown in FIGS. 7A and 7B may be combined with any of the first to third embodiments described above, which regard to the arrangement of the heat generating element 8.

A temperature detecting element shown in FIGS. 7A and 7B is the thermistor 7 similar to the embodiments described above. The first contact 71 of the thermistor 7 is connected to a heat collecting pattern 361, 371 on a high potential side (e.g., first heat collecting pattern 361, 371), and the second contact 72 is connected to a heat collecting pattern 362, 372 on a low potential side (e.g., second heat collecting pattern 362, 372). A connecting portion 33 extending from the heat collecting pattern 361, 371 on the high potential side in a direction opposite to the thermistor 7, and a connecting portion 34 extending from the heat collecting pattern 362, 372 on the low potential side in a direction opposite to the thermistor 7 will be described later with reference to FIG. 8.

In the fourth embodiment and the fifth embodiment, the heat collecting pattern on the high potential side (left side in FIG. 7) and the heat collecting patter on the low potential side (right side in FIG. 7) have symmetric shape with each other. A heat flow (solid arrow) is illustrated in the heat collecting pattern on the high potential side, and a reference direction of a curve (dashed arrow) is illustrated in the heat collecting pattern on the low potential side, for convenience.

In the heat collecting patterns 361, 362 of an electronic device 104 of the fourth embodiment shown in FIG. 7A, an outline thereof when the thermistor 7 is disposed on the inner side includes a curve R that is outwardly convex in a direction of V1 (including a direction symmetric with the illustration). That is, the thermistor 7 is disposed between the heat collecting patterns 361, 362. Each of the heat collecting patterns 361, 362 has the outline including the curve R that is outwardly convex in the direction V1, such as in a direction away from the thermistor 7. The direction V1 corresponds to a direction of a longitudinal axis connecting the first contact 71 and the second contact 72 of the thermistor 7. Each of the heat collecting patterns 361, 362 has one direction V1. The curve R may not be limited to a circular arc shape as illustrated, but may be an elliptical arc shape.

In the heat collecting patterns 361, 362 having such a shape, the heat flow H generated from a heat source Hs flows directly toward the thermistor 7. Also, the heat flow H is directed toward the thermistor 7 by being reflected by the curved edge part, by means of a similar function to a lens. Therefore, the heat flow H can be effectively collected to the thermistor 7. As such, the temperature of the heat generating element 8 can be further accurately detected.

In the heat collecting patterns 371, 372 of an electronic device 105 of the fifth embodiment shown in FIG. 7B, an outline thereof when the thermistor 7 is disposed on the inner side includes a curve R that is outwardly convex in directions of V2 (including directions symmetric with the illustration). That is, the thermistor 7 is disposed between the heat collecting patterns 371, 372. Each of the heat collecting patterns 371, 372 has the outline including the curve R that is outwardly convex in the directions V2 away from the thermistor 7. The directions V2 are inclined relative to the direction V1 of the fourth embodiment. In one heat collecting pattern, two directions V2 are defined symmetrically in an upper side and a lower side in FIG. 7B, that is, with respect to a longitudinal axis passing through the first contact 71 and the second contact 72. Also in this example, the curve R may not be limited to the circular arc shape, but may be an elliptical arc shape.

Also in the shape of the heat collecting patterns 371, 372 of the fifth embodiment, the effects similar to the fourth embodiment can be achieved. Other than these shapes, the heat collecting pattern may be formed to have an outline that includes a curve outwardly convex in three or more directions.

(Structure of Temperature Diction Circuit)

A structure of the temperature detection circuit of the electronic device will be described with reference to FIG. 8.

Figure 8:
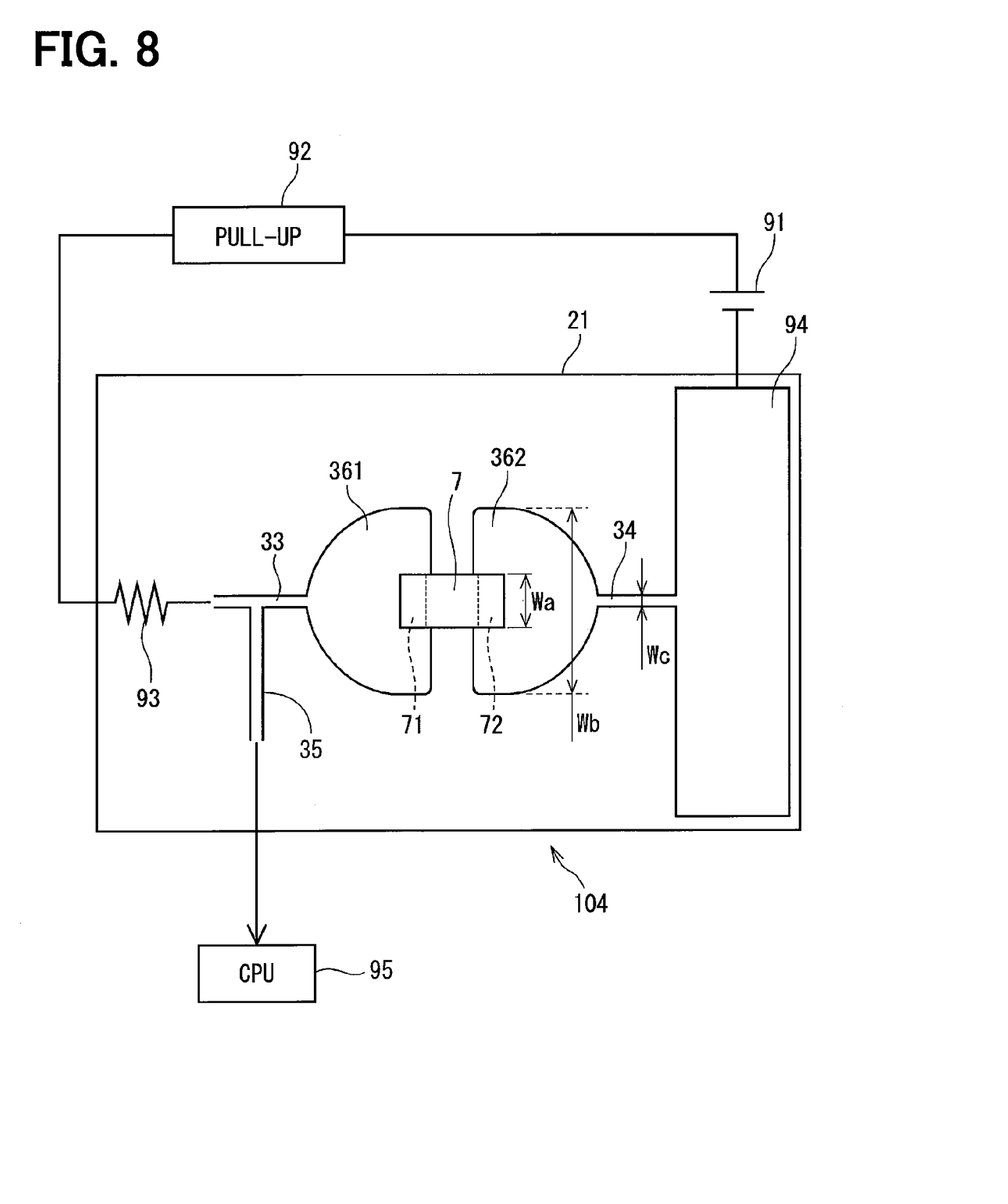
FIG. 8 is a schematic diagram illustrating a temperature detection circuit of the electronic device of each of the embodiments of the present disclosure.

In FIG. 8, the electronic device 104 having the heat collecting patterns 361, 362 of the fourth embodiment is exemplarily illustrated. The temperature detection circuit can be similarly employed in the electronic devices having the heat collecting patterns 301, 302 of the first to third embodiments and the electronic device having the heat collecting patterns 371, 372 of the fifth embodiment.

The thermistor 7 is connected in series to a voltage dividing resistor 93, between a pull-up part 92 connected to a detection power source 91, and a ground 94. Because the resistance of the thermistor 7 changes with the temperature, a potential at a detection point between the voltage dividing resistor 93 and the thermistor 7 changes. A CPU 95 detects this potential, and converts the potential detected into a temperature. In order to improve the accuracy of detection of the thermistor 7, the end (second contact) 72 of the thermistor 7 typically has the ground potential as a reference potential.

As wiring patterns on the first substrate 21, the connecting portion 33 is disposed between the voltage dividing resistor 93 and the heat collecting pattern 361 on the high potential side, and the connecting portion 34 is disposed between the heat collecting pattern 362 on the low potential side and the ground 94. Further, a diverging portion 35 is provided. The diverging portion 35 diverges from the connecting portion 33 on the high potential side and connects to the CPU 95. The ground 94 is provided as a land pattern that is larger than the heat collecting patterns 361, 362.

As described above, the width Wb of the heat collecting pattern 362 on the low potential side is greater than the width Wa of the thermistor 7. On the other hand, the width Wc of the connecting portion 34 is smaller than the width Wb of the heat collecting pattern 362. That is, the connecting portion 34 may have a minimum width that can at least keep the heat collecting pattern 362 and the ground 94 at the same potential while connecting between the heat collecting pattern 362 and the ground 94.

It is desired to reduce an occurrence of dissipation of the heat of the heat collecting pattern 362 to the ground 94 through the connecting portion 34, which is so-called "thermal dissipation", as small as possible. Therefore, when the width of the connecting portion 34 is reduced as small as possible relative to the heat collecting pattern 362, the occurrence of the thermal dissipation is reduced, and the temperature of the heat generating element 8 can be further accurately detected.

Other Embodiments

In an embodiment, the electronic device 101 to 105 includes the substrate 21, the heat generating element 8, the heat generation part pattern 6, the temperature detecting element 7, the direct under layer pattern 41, and the interlayer connection pillar 5. The heat generation part pattern is connected to the heat generating element and receives heat from the heat generating element. The temperature detecting element is disposed adjacent to the first surface 32 of the substrate and detects a temperature of the heat generating element. The direct under layer pattern 41 is disposed on a second surface of the substrate 21 opposite to the temperature detecting element 7 in an area including a portion corresponding to the temperature detecting element. The interlayer connection pillar 5 connects between the heat generation part pattern 6 and the direct under layer pattern 41 to conduct heat from the heat generation part pattern 6 to at least the direct under layer pattern 41.

In such a structure, the heat generated from the heat generating element 8 is conducted to the direct under layer pattern 41 through the heat generation part pattern 6 and the interlayer connection pillar 5, and is further conducted from the direct under layer pattern 41 to the temperature detecting element 7 through the substrate 21. Therefore, the temperature of the heat generating element 8 can be accurately detected by the temperature detecting element 7.

For example, the substrate 21 may be a first substrate, that is, one of a plurality of substrates 21, 22, 23 of a multi-layer board, and the heat generation part pattern may be disposed on another substrate of the multi-layer board, such as a lower substrate separated from the first substrate through several layers or substrates therebetween. Even if the heat generating element 8 and the temperature detecting element 7 are disposed at separate positions separated through several layers or substrates therebetween in the multi-layer board, such as one being on an upper surface layer and the other being on a lower surface layer through several inner layers or substrates in the multi-layer board, the temperature detecting element 7 can accurately detect the temperature of the heat generating element 8.

In an embodiment, the electronic device 101 to 105 further includes the heat collecting pattern 301, 302, 361, 362, 371, 372 being connected to the temperature detecting element 7 on the first surface 32 of the substrate 21. The heat collecting pattern 301, 302, 361, 362, 371, 372 has a width Wb greater than a width Wa of the temperature detecting element 7, and is opposed to the direct under layer pattern 41 through the substrate 21.

In such a case, the heat collecting pattern 301, 302, 361, 362, 371, 372 may have an area opposed to the direct under layer pattern 41 as large as possible. Therefore, the heat collecting pattern 301, 302, 361, 362, 371, 372 effectively receives heat from the direct under layer pattern 41, and conducts the heat to the temperature detecting element 7. Accordingly, the temperature detecting element 7 can further accurately detect the temperature of the heat generating element 8.

In an embodiment, the temperature detecting element 7 has the first contact 71 and the second contact 72. The temperature detecting element 7 senses a voltage between the first contact 71 and the second contact 72, and the voltage sensed is converted into a temperature. The heat collecting pattern 301, 302, 361, 362, 371, 372 includes a first heat collecting pattern 301, 361, 371 being on a high potential side and a second heat collecting pattern 302, 362, 372 being on a low potential side. The first contact 71 is connected to the detection power source 91 through the first heat collecting pattern 301, 361, 371, and the second contact 72 is connected to the ground 94 through the second heat collecting pattern 302, 362, 372.

In such a case, the connecting portion 34 connecting between the second heat collecting pattern 302, 362, 372 and the ground 94 has a width Wc smaller than a width Wb of the second heat collecting pattern 302, 362, 372. In this case, an occurrence of heat radiation from the heat collecting pattern 302, 362, 372 to the ground 94 through the connecting portion 34, which is so-called "heat dissipation", can be restricted. Therefore, the temperature of the heat generating element 8 can be further accurately detected.

For example, the temperature detecting element 7 is disposed between the first heat collecting pattern 361, 371 and the second heat collecting pattern 362, 372, and at least one of the first heat collecting pattern 361, 371 and the second heat collecting pattern 362, 372 has an outline including a curve that is outwardly convex at least in one direction away from the temperature detecting element 7.

In such a case, inside of each heat collecting pattern, a heat flow reflected at an edge of the curve can be directed toward the temperature detecting element 7. Therefore, the temperature of the heat generating element 8 can be further accurately detected.

For example, the heat generating element 8 is a semiconductor switching element having the lead part 81. The heat generating element 8 is mounted on the mounting surface 61 of the electronic device such that the lead part 81, which may correspond to a drain terminal and a source terminal, faces the mounting surface 61. The heat generating element 8 is disposed to radiate heat to a heat sink 12 from the rear surface 82, which may provide a source electrode, opposite to the lead part 81.

Such a "rear surface heat radiation structure" is, for example, employed in a case where the amount of heat generated from the semiconductor switching element is large and the heat radiation cannot be sufficiently carried out only from the lead part 81. Therefore, it is highly required to further accurately detect the temperature so as to suitably restrict overheating. Accordingly, when the structure including the direct under layer pattern 41 and the interlayer connection pillar 5 is employed, the effect of improvement of the temperature detection accuracy can be effectively achieved.

(a) Considering the size and mountability onto the substrate, a chip type thermistor is most realistic as the "temperature detecting element" of the present disclosure. However, in the technical idea of the present disclosure, the temperature detecting element may include a lead-type thermistor, a thermocouple, a resistance thermometer bulb, or the like, other than the chip-type thermistor. For example, it is actually, fully assumed to use a thermocouple or the like in the detection of the heat collecting pattern in a test phase of a trial product.

(b) The "heat generating element" of the present disclosure includes general elements that possibly generate heat, such as a semiconductor switching element of an IGBT or the like, integrated ICs, such as a thyristor, an IC, and a microcomputer, other than the MOSFET.

As described above, the present disclosure may not be limited to these embodiments, but may be implemented in any other ways without departing from the gist of the disclosure.

As described above, the figures illustrating each embodiment schematically illustrate an essential part of the present disclosure, and do not exactly reflect the form of the actual electronic device. Judgment whether the products actually on the market belong to the technical range of the present disclosure should be made based on whether the structure of the product satisfies the structural elements such as the direct under layer pattern and the interlayer connection pillars, without depending on the appearance of the whole product.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. An electronic device comprising:
   a multi-layer board having a plurality of substrates in layers, the plurality of substrates including a first substrate and a second substrate;
   a heat generation part pattern being disposed on a surface of the second substrate;
   a heat generating element generating heat, the heat generating element being disposed on the heat generation part pattern to conduct the heat to the heat generation part pattern;
   a temperature detecting element being disposed adjacent to a first surface of the first substrate and detecting a temperature of the heat generating element;
   a direct under layer pattern disposed on a second surface of the first substrate opposite to the temperature detecting element and in an area including a portion corresponding to the temperature detecting element, the direct under layer pattern being in a layer different from the heat generation part pattern;
   an interlayer connection pillar connecting between the heat generation part pattern and the direct under layer pattern to conduct the heat from the heat generation part pattern to the direct under layer pattern; and
   a heat collecting pattern being disposed on the first surface of the first substrate and connected to the temperature detecting element, the heat collecting pattern having a width greater than a width of the temperature detecting element and being opposed to the direct under layer pattern through the first substrate.

2. The electronic device according to claim 1, wherein
   the temperature detecting element has a first contact and a second contact,
   the temperature detecting element senses a voltage between the first contact and the second contact to detect the temperature,
   the heat collecting pattern includes a first heat collecting pattern being on a high potential side and a second heat collecting pattern being on a low potential side,
   the first contact is connected to a detection power source through the first heat collecting pattern, and
   the second contact is connected to a ground through the second heat collecting pattern.

3. The electronic device according to claim 2, wherein
   a connecting portion connecting between the second heat collecting pattern and the ground has a width smaller than a width of the second heat collecting pattern.

4. The electronic device according to claim 1, wherein
   the temperature detecting element is disposed between the first heat collecting pattern and the second heat collecting pattern, and
   at least one of the first heat collecting pattern and the second heat collecting pattern has an outline including a curve that is outwardly convex at least in one direction away from the temperature detecting element.

5. The electronic device according to claim 1, further comprising
   a mounting surface on a side opposite to the temperature detecting element, wherein
   the heat generating element is a semiconductor switching element having a lead part,
   the heat generating element is mounted on the mounting surface such that the lead part faces the mounting surface, and
   the heat generating element is disposed to radiate heat to a heat sink through a rear surface opposite to the lead part.

6. The electronic device according to claim 1, wherein the interlayer connection pillar connects the heat generation part pattern and the first substrate.

* * * * *